United States Patent
Yan et al.

(10) Patent No.: US 11,069,133 B2
(45) Date of Patent: Jul. 20, 2021

(54) METHOD AND DEVICE FOR GENERATING THREE-DIMENSIONAL SCENE MAP

(71) Applicant: BAIDU ONLINE NETWORK TECHNOLOGY (BEIJING) CO., LTD., Beijing (CN)

(72) Inventors: Feilong Yan, Beijing (CN); Tongtong Zhao, Beijing (CN); Jin Fang, Beijing (CN); Liang Wang, Beijing (CN); Yu Ma, Beijing (CN); Ruigang Yang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/545,397

(22) Filed: Aug. 20, 2019

(65) Prior Publication Data
US 2020/0074729 A1 Mar. 5, 2020

(30) Foreign Application Priority Data
Aug. 30, 2018 (CN) .......................... 201811003349.5

(51) Int. Cl.
*G06T 17/05* (2011.01)
*G06K 9/00* (2006.01)
(Continued)

(52) U.S. Cl.
CPC .............. *G06T 17/05* (2013.01); *G01S 17/89* (2013.01); *G06K 9/00805* (2013.01); *G06K 9/6284* (2013.01)

(58) Field of Classification Search
None
See application file for complete search history.

(56) References Cited

U.S. PATENT DOCUMENTS

| 2013/0228620 A1* | 9/2013 | Ahern | G06F 16/50 235/439 |
| 2016/0093101 A1* | 3/2016 | Benedek | G06T 7/194 345/420 |

(Continued)

FOREIGN PATENT DOCUMENTS

| CN | 104573191 A | * | 4/2015 |
| CN | 108460791 A | | 8/2018 |

(Continued)

OTHER PUBLICATIONS

Romanoni et al. "Mesh-based 3D Textured Urban Mapping" Cornell University Library, Ithaca, NY, Aug. 18, 2017 (Year: 2017).*

(Continued)

*Primary Examiner* — Steven Z Elbinger
(74) *Attorney, Agent, or Firm* — Lathrop GPM LLP (57) ABSTRACT

The present disclosure provides a method and a device for generating a 3D scene map, a related apparatus and a storage medium. The method includes the following. At least two frames of point cloud data collected by a collection device is obtained. Data registration is performed on the at least two frames of point cloud data. First type of point cloud data corresponding to a movable obstacle is deleted from each frame of point cloud data and each frame of point cloud data is merged to obtain an initial scene map. Second type of point cloud data corresponding to a regularly shaped object is replaced with model data of a geometry model matching with the regularly object for the initial scene map to obtain the 3D scene map.

15 Claims, 4 Drawing Sheets obtaining at least two frames of point cloud data collected by a collection device, and performing data registration on the at least two frames of point cloud data — 101 deleting, from each frame of point cloud data, first type of point cloud data corresponding to a movable obstacle and merging each frame of point cloud data to obtain an initial scene map — 102 replacing second type of point cloud data corresponding to a regularly shaped object with model data of a geometry model matching with the regularly shaped object for the initial scene map to obtain the 3D scene map — 103

(51) Int. Cl.
*G06K 9/62* (2006.01)
*G01S 17/89* (2020.01)

(56) References Cited

U.S. PATENT DOCUMENTS

| | | |
|---|---|---|
| 2018/0003511 A1 | 1/2018 | Browning et al. |
| 2019/0011529 A1* | 1/2019 | Choi .................... G06K 9/0063 |
| 2019/0073827 A1* | 3/2019 | Coronado ................ H04Q 9/00 |

FOREIGN PATENT DOCUMENTS

| | | |
|---|---|---|
| WO | WO 2007069721 A1 | 6/2007 |
| WO | WO 2008099915 A1 | 8/2008 |
| WO | WO 2014188225 A1 | 11/2014 |
| WO | WO 2018060313 A1 | 4/2018 |
| WO | WO 2018104563 A2 | 6/2018 |

OTHER PUBLICATIONS

Litomisky, Krystof, and Bir Bhanu. "Removing moving objects from point cloud scenes." In International Workshop on Depth Image Analysis and Applications, pp. 50-58. Springer, Berlin, Heidelberg, 2012. (Year: 2012).*

European Patent Application No. 19189969.9, partial Search Report and Opinion dated Jan. 24, 2020, 15 pages.

Romanoni, A. et al. "Mesh-based 3D Textured Urban Mapping" Cornell University Library, Ithaca, NY, Aug. 18, 2017, 7 pages.

Japanese Patent Application No. 2019-157031, Office Action dated Sep. 23, 2020, 4 pages.

Japanese Patent Application No. 2019-157031, English translation of Office Action dated Sep. 23, 2020, 4 pages.

\* cited by examiner

METHOD AND DEVICE FOR GENERATING THREE-DIMENSIONAL SCENE MAP

CROSS REFERENCE TO RELATED APPLICATIONS

This application claims priority and benefits to Chinese Application No. 201811003349.5, filed on Aug. 30, 2018, the entire content of which is incorporated herein by reference.

FIELD

Embodiments of the present disclosure relate to a field of point cloud processing technology, and more particularly, to a method and a device for generating a three-dimensional scene map, a related device and a storage medium.

BACKGROUND

Simulation based on point cloud data is a kind of technology of generating virtual point cloud data with a strong sense of reality based on point cloud data of a target scene and a computer aided design model, which may be used to construct a large-scale scene. For example, a variety of road scenes are constructed for training a three-dimensional (3D) perception module of unmanned driving. The simulation based on point cloud data needs a 3D static environment as its background environment.

SUMMARY

Embodiments of the present disclosure provide a method and a device for generating a three-dimensional scene map, a related apparatus and a storage medium.

In a first aspect, embodiments of the present disclosure provide a method for generating a three-dimensional scene map. The method includes:

obtaining at least two frames of point cloud data collected by a collection device, and performing data registration on the at least two frames of point cloud data;

deleting, from each frame of point cloud data, first type of point cloud data corresponding to a movable obstacle, and merging each frame of point cloud data to obtain an initial scene map; and replacing second type of point cloud data corresponding to a regularly shaped object with model data of a geometry model matching with the regularly shaped object for the initial scene map to obtain the three-dimensional scene map.

In a second aspect, embodiments of the present disclosure provide an apparatus. The apparatus includes one or more processors; and a memory configured to store one or more programs. When the one or more programs are executed by the one or more processors, the one or more processors are caused to perform the method for generating a three-dimensional scene map according to embodiments of the present disclosure.

In a third aspect, embodiments of the present disclosure provide a computer readable storage medium, having computer programs stored therein. When the computer programs are executed by a processor, the method for generating a three-dimensional scene map according to embodiments of the present disclosure is executed.

DETAILED DESCRIPTION

The present disclosure will be described in detail below with reference to accompanying drawings and embodiments. It may be understood that, the specific embodiments described herein are only used to explain the present disclosure rather than limiting the present disclosure. In addition, it should also be noted that, for convenience of description, only part but not all structures related to the present disclosure are illustrated in the accompanying drawings.

In related arts, two methods of obtaining point cloud data of the 3D static environment exist. A first method is to manually create a 3D grid model of the 3D static environment for simulating the scene and to obtain point cloud data of the 3D static environment via a virtual sensor (such as a camera or a 3D scanner). A second method is to collect point cloud data of the 3D static environment with a high precision and a high density via a laser scanner with a high precision.

With the first method, a cost of creating the model is high. Using an existing 3D modeling technology, it may be impossible to automatically create a model simulating a scene with a strong sense of reality or simulating a scene including a single obstacle. Therefore, a fully-manual and a semi-automatic modeling method is required. As a result, a cost of manpower and material resources to create a model simulating a large-scale scene including a large number of obstacles is high. With the second method, an enormous amount of data and inconvenience of transporting the laser scanner with the high precision increases the cost of creating the 3D static environment. Thus, the existing methods in related arts cannot be applied to other scenes, limiting the application of the simulation based on point cloud data.

Therefore, the present disclosure provides a method and a device for generating a three-dimensional (3D) scene map. With the method and the device, a three-dimensional background map may be generated based on the point cloud data collected by the collection device to ensure that the quality of the 3D background map may satisfy requirements of the simulation based on point cloud data while reducing cost and facilitating to apply the present disclosure to different scene.

Figure 1:
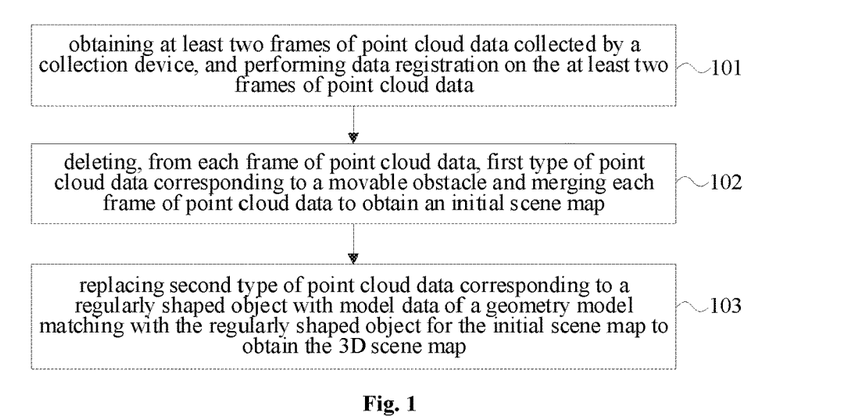
FIG. 1 is a flow chart illustrating a method for generating a three-dimensional scene map according to embodiments of the present disclosure.

FIG. 1 is a flow chart illustrating a method for generating a three-dimensional scene map according to embodiments of the present disclosure. The embodiment may be applicable to generating a three-dimensional (3D) scene map. The method may be implemented by a device for generating a 3D scene map. The device may be implemented in software and/or hardware and may be equipped in a computer device. As illustrated in FIG. 1, the method includes the following.

At block 101, at least two frames of point cloud data collected by a collection device is obtained, and a data registration is performed on the at least two frames of point cloud data.

To build a 3D scene map, it is required to obtain the point cloud data. By mapping a scene with a 3D laser scanning device, points representing surface information of an object, commonly referred to as point cloud data, may be obtained.

In some examples, a 3D laser scanner may be equipped on the collection device (such as a fundament collection device). The collection device may be driven to travel within a designated scene to collect depth data of surfaces contained in the designated scene. The collection device may be an unmanned vehicle and the designated scene may be a road. The 3D laser scanner is a stereo measuring instrument which emits, by a laser sensor, lasers constantly onto a surface of an object to be measured and receives, by a laser pulse receiver, light reflected from the surface of the object to be measured, to measure a distance corresponding to the object to be measured through conversion and calculation.

The 3D laser scanning device may need to obtain the point cloud data from different angles to obtain all point cloud data of the surface of the object to be measured. However, the point cloud data is isolated to each other. Therefore, there is a need to transfer the point cloud data from different angles in a same coordinate system to obtain complete object surface information. The process of obtaining the complete object surface information using the point cloud data from different angles is called data registration. At present, there may include a global registration algorithm and a local registration algorithm classified according to an implementation process. The global registration algorithm includes an iterative nearest point algorithm, a geometric feature-based registration algorithm and a dynamic registration algorithm. The local registration algorithm includes a registration algorithm based on surface features. Thus, the data registration is performed on the at least two frames of point cloud data according to a preset registration algorithm, so that continuous frames of point cloud data collected by the collection device may be accurately transformed in a unified coordinate system.

At block 102, first type of point cloud data corresponding to a movable obstacle is deleted from each frame of point cloud data, and each frame of point cloud data are merged to obtain an initial scene map.

The at least two frames of point cloud data collected by the collection device may include point cloud data corresponding to an immovable object and point cloud data corresponding to the movable object respectively. The 3D scene map is generated based on the immovable object, such as a road, a wall and the like, and excludes the movable object. Thus, it is necessary to delete the first type of point cloud data corresponding to the movable object from each frame of point cloud data when generating the 3D scene map.

The movable obstacle is a movable object, such as a vehicle or a passerby, in the designated scene. The first type of point cloud data are the point cloud data corresponding to the movable obstacle. By deleting the point cloud data corresponding to the movable obstacle from each frame of point cloud data, the remaining point cloud data is the point cloud data corresponding to a static obstacle. Each frame of remaining point cloud data is merged to obtain the original scene map. In some examples, a global coordinate system may be built by taking a location of the collection device as a coordinate origin when collecting a first frame of point cloud data. Other frames of point cloud data may be transferred in the global coordinate system of the first frame of point cloud data through rotation and translation of coordinates, to create the original scene map.

Further, generally, the collection device may have a navigation device, such as a GPS (global positioning system). Thus, a coordinate of the position of the point cloud data in a geographic coordinate system may be determined based on a real-time positioning point of the collection device in the geographic coordinate system.

At block 103, second type of point cloud data corresponding to a regularly shaped object is replaced with model data of a geometry model matching with the regularly shaped object for the initial scene map to obtain the 3D scene map.

The point cloud data collected by the collection device generally has large noise and errors. Thus, even each frame of point cloud data is transformed in the unified coordinate system, it may be impossible to create the 3D scene map that may be directly used. For example, ground may be ten centimeters thick.

The regularly shaped object may be an artificial object in the original scene map. The second type of point cloud data may be the point cloud data corresponding to the artificial object in the original scene map. Objects in the scene may be classified into two categories in advance. The two categories include a category of natural object, such as plants and a category of artificial object, such as a road, a wall, and the like. For the natural object, original point cloud data are kept. For the artificial object, the 3D modeling technology may be used to generate the model data of the geometry model matching with the artificial object. The second type of point cloud data corresponding to at least one regularly shaped object may be replaced with smooth and natural model data of the geometry model matching with the regularly shaped object to obtain the 3D scene map. Thus, a problem of a distortion of the artificial object is solved without affecting a quality of the simulation based on point cloud data.

According to the method for generating a 3D scene map provided by embodiments of the present disclosure, the data registration is performed on the at least two frames of point cloud data collected by the collection device. The first type of point cloud data corresponding to the movable obstacle is deleted from each frame of point cloud data, and each frame of point cloud data is merged to obtain the initial scene map. The second type of point cloud data corresponding to the regularly shaped object is replaced with the model data of the geometry model matching with the regularly shaped object for the initial scene map to obtain the 3D scene map. The 3D background map may be generated using the point cloud data collected by the collection device to ensure that the quality of the 3D background map may satisfy requirements of the simulation based on point cloud data while reducing cost and facilitating to apply the method to different scenes.

Figure 2:
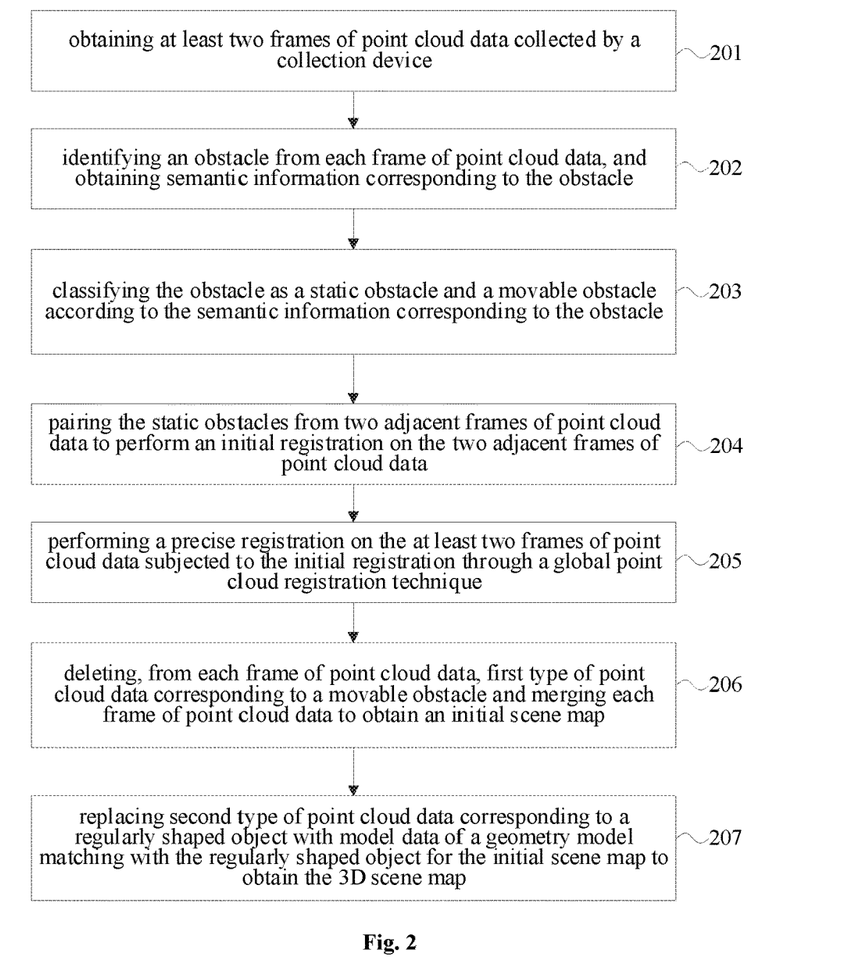
FIG. 2 is a flow chart illustrating a method for generating a three-dimensional scene map according to embodiments of the present disclosure.

FIG. 2 is a flow chart illustrating a method for generating a 3D scene map according to embodiments of the present disclosure. Details are made on the basis of the above embodiment illustrated in FIG. 1. In embodiments, performing the data registration on the at least two frames of point cloud data may include the following. An obstacle is identified from each frame of point cloud data. Semantic information corresponding to the obstacle is obtained. For each frame of point cloud data, the obstacle is classified as a static obstacle or the movable obstacle based on the semantic information corresponding to the obstacle. The static obstacle in two adjacent frames of point cloud data are paired to perform an initial registration on the two adjacent frames of point cloud data. A precise registration is performed on the at least two frames of point cloud data subjected to the initial registration through a global point cloud registration technique.

As illustrated in FIG. 2, in some examples, the method includes the following.

At block 201, at least two frames of point cloud data collected by the collection device are obtained.

At block 202, an obstacle is identified from each frame of point cloud data, and semantic information corresponding to the obstacle is obtained.

An obstacle detection algorithm may be used to identify the obstacle included in each frame of point cloud data and to obtain the semantic information corresponding to the obstacle. For example, the semantic information corresponding to the obstacle may include a trash can, a telegraph pole, a vehicle, a passerby, and the like. In some examples, a more accurate offline obstacle detection algorithm is used.

At block 203, the identified obstacle is classified as a static obstacle and the movable obstacle according to semantic information corresponding to the obstacle, for each frame of point cloud data.

The static obstacle is an immovable object in the scene. The movable obstacle is a movable object in the scene. For example, the obstacle corresponding to the garbage can and the obstacle corresponding to the telegraph pole may be classified as the static obstacle. The obstacle corresponding to the vehicle and the obstacle corresponding to the passerby may be classified as the movable obstacle.

At block 204, the static obstacles included in two adjacent frames of point cloud data are paired, to perform an initial registration on the two adjacent frames of point cloud data.

Pairing the static obstacles included in two adjacent frames of point cloud data is to calculate a trajectory of the static obstacle. By calculating the trajectory of the static obstacle, a detection result of the static obstacle for a single-frame of point cloud data may be corrected using multi-frames of point cloud data. Even if false detection and miss detection of the static obstacle occurs for a certain frame of point cloud data, the detection may be repaired by analyzing previous frames of point cloud data and later frames of point cloud data.

The initial registration may be performed on the two adjacent frames of point cloud data according to a pairing result after pairing the static obstacles in the two adjacent frames of point cloud data. The initial registration is to determine a rotation and translation matrix approximate to a relative location relationship between the two frames of point cloud data when the relative location relation between the two frames of point cloud data is completely unknown. Although the rotation and translation matrix obtained by the initial registration may be inaccurate, it may be closed to an accurate rotation and translation matrix between the two frames of point cloud data. In some examples, the initial registration may be performed on the two adjacent frames of point cloud data by adopting a sampling consistency initial registration algorithm.

At block 205, a precise registration is performed on the at least two frames of point cloud data subjected to the initial registration through a global point cloud registration technique.

The global point cloud registration technique may be one of an iterative nearest point algorithm, a geometric feature-based registration algorithm and a dynamic registration algorithm.

At block 206, first type of point cloud data corresponding to the movable obstacle is deleted from each frame of point cloud data, and each frame of point cloud data is merged to obtain the initial scene map.

In some examples, after the first type of point cloud data corresponding to the movable obstacle is deleted from each frame of point cloud data, the method may further includes performing a data re-registration on each frame of point cloud data using the global point cloud registration technique.

Thus, through the data re-registration, a more accurate result of performing the data registration on the point cloud data may be obtained.

At block 207, the second type of point cloud data corresponding to the regularly shaped object is replaced with the model data of the geometry model matching with the regularly shaped object for the initial scene map to obtain the 3D scene map.

According to the method for generating the 3D scene map provided by embodiments of the present disclosure, by identifying the obstacle from each frame of point cloud data, the obstacle is classified as the static obstacle and the movable obstacle based on the semantic information of the obstacle, for each frame of point cloud data. The static obstacles included in two adjacent frames of point cloud data are paired to perform an initial registration on the two adjacent frames of point cloud data. A precise registration is performed on the at least two frames of point cloud data subjected to the initial registration through the global point cloud registration technique. The detection result of the static obstacle for a single-frame of point cloud data may be corrected to prevent false detection or miss detection of the static obstacle in a frame of point cloud data. A more accurate data registration of point cloud data may be achieved with two data registrations.

Figure 3:
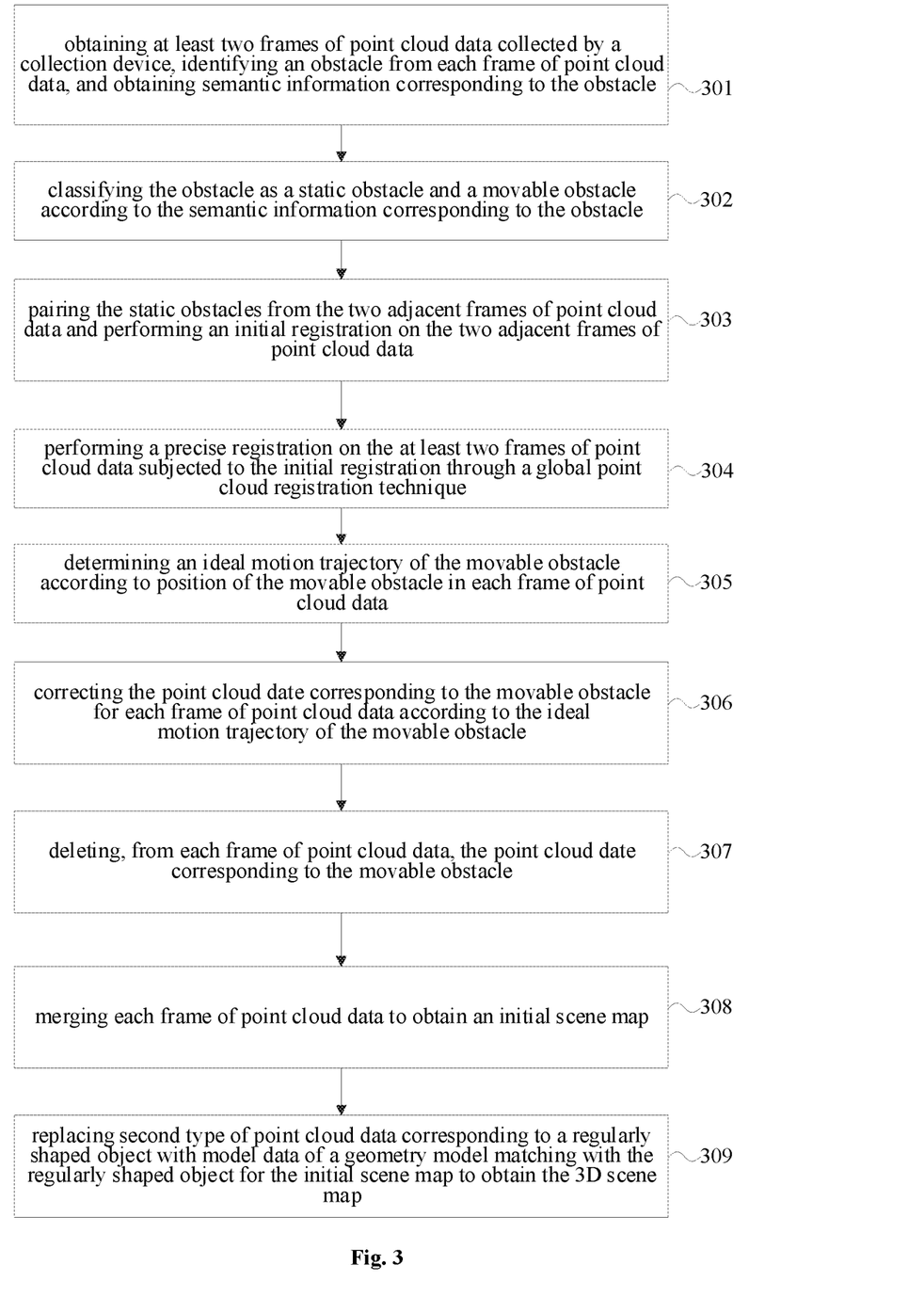
FIG. 3 is a flow chart illustrating a method for generating a three-dimensional scene map according to embodiments of the present disclosure.

FIG. 3 is a flow chart illustrating a method for generating a 3D scene map according to embodiments of the present disclosure. Details are made on the basis of the above embodiment illustrated in FIGS. 1 and 2. In the embodiment, deleting, from each frame of point cloud data, the first type of point cloud data corresponding to the movable obstacle may include the following. An ideal motion trajectory of the movable obstacle is determined according to a position of the movable obstacle in each frame of point cloud data. The first type of point cloud data corresponding to the movable obstacle is corrected for each frame of point cloud data based on the ideal motion trajectory of the movable obstacle. The first type of point cloud data corresponding to the movable obstacle is deleted from each frame of point cloud data.

As illustrated in FIG. 3, in some examples, the method includes the following.

At block 301, at least two frames of point cloud data collected by the collection device are obtained, an obstacle is identified from each frame of point cloud data, and semantic information corresponding to the obstacle is obtained.

At block 302, the obstacle is classified as a static obstacle and the movable obstacle according to the semantic information corresponding to the obstacle.

At block 303, the static obstacles from two adjacent frames of point cloud data are paired to perform the initial registration on the two adjacent frames of point cloud data according to a pairing result.

At block 304, a precise registration is performed on the at least two frames of point cloud data subjected to the initial registration through a global point cloud registration technique.

At block 305, an ideal motion trajectory of the movable obstacle is determined based on the position of the movable obstacle in each frame of point cloud data.

The ideal motion trajectory is a motion trajectory formed from the position of the movable obstacle of each frame of point cloud data. For example, according to a position of a passerby in each frame of point cloud data, the ideal motion trajectory corresponding to the passerby, i.e. a movement of the passerby, may be determined.

At block 306, the first type of point cloud data corresponding to the movable obstacle is corrected for each frame of point cloud data based on the ideal motion trajectory of the movable obstacle.

The first type of point cloud data corresponding to the same movable obstacle corresponds to each other for each frame of point cloud data. The first type of point cloud data corresponding to the movable obstacle in each frame of point cloud data is corrected according to the ideal motion trajectory of the movable obstacle. That is, the detection result of the movable obstacle for a single-frame of point cloud data may be corrected based on continuous multi-frame of point cloud data. Even if a miss detection or a false detection of a movable obstacle occurs for a certain frame of point cloud data, the detection may be repaired by analyzing previous and later frames of point cloud data. For example, according to the position of the passerby in each frame of point cloud data, the ideal motion trajectory corresponding to the passerby may be determined. According to the ideal motion trajectory, it may be determined that the passerby is included in a certain frame of point cloud data. However, a miss detection of the cloud point data corresponding to the passerby may occur for the certain frame of point cloud data. Therefore, the detection may be repaired by adding the point cloud data corresponding to the passerby into the certain frame of point cloud data based on the ideal motion trajectory corresponding to the passerby.

At block 307, the first type of point cloud data corresponding to the movable obstacle is deleted from each frame of point cloud data.

After deleting the point cloud data corresponding to the movable obstacle from each frame of point cloud data, remaining point cloud data is the point cloud data corresponding to the static obstacle.

At block 308, each frame of point cloud data is merged to obtain the initial scene map. At block 309, the second type of point cloud data corresponding to the regularly shaped object is replaced with the model data of the geometry model matching with the regularly shaped object for the initial scene map to obtain the 3D scene map.

According to the method for generating a 3D scene map provided by embodiments of the present disclosure, the ideal motion trajectory of the movable obstacle is determined according to position of the movable obstacle in each frame of point cloud data. The point cloud data corresponding to the movable obstacle is corrected for each frame of point cloud data according to the ideal motion trajectory of the movable obstacle. The point cloud data corresponding to the movable obstacle is deleted from each frame of point cloud data. Therefore, the detection result of the movable obstacle for a single-frame of point cloud data may be corrected using to prevent a miss detection or false detection of a movable obstacle in a frame of point cloud data. In addition, the point cloud data corresponding to the movable obstacle may be deleted according to the semantic information.

Figure 4:
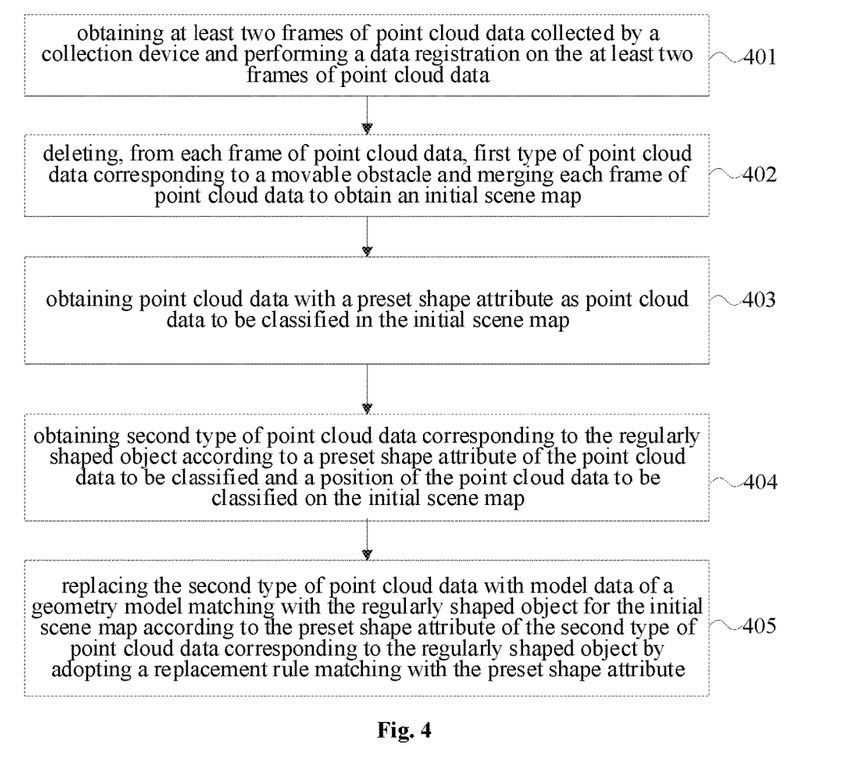
FIG. 4 is a flow chart illustrating a method for generating a three-dimensional scene map according to embodiments of the present disclosure.

FIG. 4 is a flow chart illustrating a method for generating a 3D scene map according to embodiments of the present disclosure. Details are illustrated on the basis of the above embodiments illustrated in FIGS. 1 to 3. In the embodiment, replacing the second type of point cloud data corresponding to the regularly shaped object with the model data of the geometry model matching with the regularly shaped object for the initial scene map to obtain the 3D scene map may include the following. Point cloud data with a preset shape attribute is obtained as point cloud data to be classified. The second type of point cloud data corresponding to the regularly shaped object is obtained according to the preset shape attribute of the point cloud data to be classified and a position of the point cloud data to be classified on the initial scene map. The second type of point cloud data of the initial scene map is replaced with the model data of the geometry model matching with the regularly shaped object according to the preset shape attribute of the second type of point cloud data corresponding to the regularly shaped object by adopting a replacement rule matching with the preset shape attribute.

As illustrated in FIG. 4, in some examples, the method includes the following.

At block 401, at least two frames of point cloud data collected by the collection device are obtained, and a data registration is performed on the at least two frames of point cloud data.

At block 402, the first type of point cloud data corresponding to the movable obstacle is deleted from each frame of point cloud data to merge each frame of point cloud data to obtain the initial scene map.

At block 403, point cloud data with a preset shape attribute is obtained from the initial scene map as point cloud data to be classified.

The point cloud data with the preset shape attribute is detected from each frame of point cloud data. In some examples, the shape attribute may include: a plane attribute, and/or a column attribute. The detected point cloud data with the preset shape attribute may be obtained as the point cloud data to be classified.

At block 404, the second type of point cloud data corresponding to the regularly shaped object is obtained according to the preset shape attribute of the point cloud data to be classified and a position of the point cloud data to be classified on the initial scene map.

The regularly shaped object may be a road, a wall, a garbage can and a telegraph pole. For example, the preset shape attribute of point cloud data to be classified may be a plane attribute. The second type of point cloud data corresponding to the wall may be obtained according to the plane attribute of the point cloud data to be classified and the position of the point cloud data to be classified on the initial scene map.

In some examples, after the second type of point cloud data corresponding to the regularly shaped object is obtained according to the preset shape attribute of the point cloud data to be classified and the position of the point cloud data to be classified on the initial scene map, the method further includes for a frame point cloud data, supplementing and/or correcting the second type of shape data corresponding to the regularly shaped object according to second type of shape data corresponding to the regularly shaped object of remaining frames of point cloud data and attribute information of the regularly shaped object.

The second type of shape data corresponding to the regularly shaped object is identical to each other for each frame of point cloud data. If a miss detection of a regularly shaped object occurs to a certain frame of point cloud data, the second type of shape data corresponding to the regularly shaped object may be supplemented for the certain frame according to the second type of shape data corresponding to same regularly shaped object and the attribute information of the regularly shaped object. If a false detection of a regularly shaped object occurs to a certain frame of point cloud data, the second type of shape data corresponding to the regularly shaped object may be corrected for the certain frame according to the second type of shape data corresponding to the regularly shaped object and the attribute information of the regularly shaped object.

Thus, by correcting the detection result of the regularly shaped object for the single-frame of point cloud data based on the second type of shape data corresponding to the regularly shaped object, the second type of shape data corresponding to the regularly shaped object may be repaired even if a miss detection or a false detection of the regularly shaped object occurs to a certain frame of point cloud data.

At block 405, the second type of point cloud data is replaced with the model data of the geometry model matching with the regularly shaped object for the initial scene map according to the preset shape attribute of second type of point cloud data corresponding to the regularly shaped object by adopting a replacement rule matching the preset shape attribute.

According to the preset shape attribute of the second type of point cloud data corresponding to the regularly shaped object, the model data of the geometry model matching with the regularly shaped object may be generated by using a 3D modeling technique. In some examples, the model data of the geometry model is in a form of 3D patch. The model data of the geometry model matching with the regularly shaped object may be generated by using a patch modeling technique. The patch modeling technique is a modeling method different from a grid modeling method and a surface modeling method. With less patches, the patch modeling method may achieve a realistically smooth effect. A user may control the entire model with a few control points.

In some examples, replacing the second type of point cloud data with the model data of the geometry model matching with the regularly shaped object according to the preset shape attribute of the second type of point cloud data corresponding to the regularly shaped object by adopting a replacement rule matching with the preset shape attribute may include the following. If it is determined that the shape attribute of the second type of point cloud data corresponding to a target regularly shaped object is the plane attribute, the second type of point cloud data corresponding to the target regularly shaped object is replaced with model data corresponding to a thin plane with a preset thickness by using a volume pixel fusion technique. For example, the target regularly shaped object may be a road or a wall. The shape attribute of the second type of point cloud data corresponding to the regularly shaped object is the plane attribute. The second type of point cloud data corresponding to the target regularly shaped object is replaced with the model data corresponding to the thin plane with the preset thickness by using the volume pixel fusion technique. If it is determined that the shape attribute of the second type of point cloud data corresponding to the target regularly shaped object is the column attribute, a column model matching with a predicted value of a column parameter is obtained according to the predicted value of the cylinder parameter of the target regular object; replacing the second type of point cloud data corresponding to the target regularly shaped object with model data corresponding to the column model. For example, the target regularly shaped object is a telegraph pole. The shape attribute of the second type of point cloud data corresponding to the regularly shaped object is the column attribute. The column model matching with the predicted value of the column parameter may be obtained according to the predicted value of the column parameter (such as a base area and a height of the column) of the target regularly shaped object. The second type of point cloud data corresponding to the target regularly shaped object is replaced with the model data corresponding to the column model.

According to the method for generating a 3D scene map provided by embodiments of the present disclosure, the point cloud data with the preset shape attribute are obtained as the point cloud data to be classified. The second type of point cloud data corresponding to the regularly shaped object is obtained according to the preset shape attribute of the point cloud data to be classified and the position of the point cloud data to be classified on the initial scene map. The second type of point cloud data is replaced with the model data of the geometry model matching with the regularly shaped object for the initial scene map according to the preset shape attribute of the second type of point cloud data corresponding to the regularly shaped object by adopting the replacement rule matching with the preset shape attribute. For an artificial object on the original scene map, the 3D modeling technology may be used to generate the model data of the geometry model matching with the artificial object. The point cloud data corresponding to the artificial object is replaced with smooth and natural model data of the geometry model matching with the artificial object to obtain the 3D scene map. Thus, a problem of a distortion of the artificial object is solved without affecting a quality of a simulation based on point cloud data.

Figure 5:
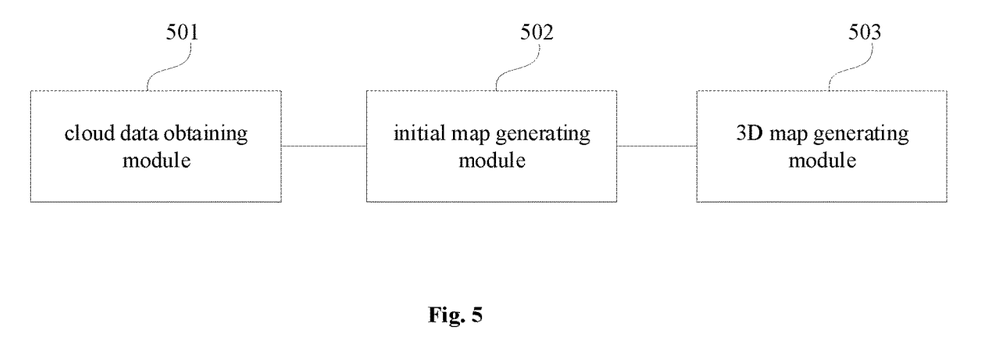
FIG. 5 is a block diagram illustrating a device for generating a three-dimensional scene map according to embodiments of the present disclosure.

FIG. 5 is a block diagram illustrating a device for generating a 3D scene map according to embodiments of the present disclosure. As illustrated in FIG. 5, The device may be a computer device. The device may include a cloud data obtaining module 501, an initial map generating module 502 and a 3D map generating module 503.

The cloud data obtaining module 501 is configured to obtain at least two frames of point cloud data collected by a collection device and to perform data registration on the at least two frames of point cloud data. The initial map generating module 502 is configured to delete first type of point cloud data corresponding to a movable obstacle from each frame of point cloud data and to merge each frame of point cloud data to obtain an initial scene map. The 3D map generating module 503 is configured to replace second type of point cloud data corresponding to a regularly shaped object with model data of a geometry model matching with the regularly shaped object for the initial scene map to obtain the 3D scene map.

According to the device for generating a 3D scene map provided by embodiments of the present disclosure, at least two frames of point cloud data collected by the collection device are obtained. The data registration is performed on the at least two frames of point cloud data. The first type of point cloud data corresponding to the movable obstacle is deleted from each frame of point cloud data, and each frame of point cloud data is merged to obtain the initial scene map. The second type of point cloud data corresponding to the regularly shaped object is replaced with the model data of the geometry model matching with the regularly shaped object for the initial scene map to obtain the 3D scene map. A 3D background map may be generated by using the point cloud data collected by the collection device to ensure that the quality of the 3D background map may satisfy requirements of a simulation based on point cloud data simulation while reducing cost and facilitating to apply the device to different scenes.

On the basis of the above embodiment, the cloud data obtaining module 501 may include a semantic information identifying unit, an information classifying unit, an initial registration unit and a precise registration unit. The semantic information identifying unit may be configured to identify an obstacle from each frame of point cloud data and to obtain semantic information corresponding to the obstacle. The information classifying unit may be configured to classify the obstacle as a static obstacle and the movable obstacle according to the semantic information corresponding to the obstacle. The initial registration unit may be configured to pair the static obstacles included in two adjacent frames of point cloud data to perform an initial registration on the two adjacent frames of point cloud data. The precise registration unit may be configured to perform a precise registration on the at least two frames of point cloud data subjected to the initial registration through a global point cloud registration technique.

On the basis of the above embodiment, the initial map generating module 502 may include a trajectory determining unit, a data correcting unit and a data deleting unit. The trajectory determining unit may be configured to determine an ideal motion trajectory of the movable obstacle according to a position of the movable obstacle in each frame of point cloud data. The data correcting unit may be configured to correct the point cloud data corresponding to the movable obstacle for each frame of point cloud data according to the ideal motion trajectory of the movable obstacle. The data deleting unit may be configured to delete the point cloud data corresponding to the movable obstacle from each frame of point cloud data.

On the basis of the above embodiment, the initial map generating module 502 may further include a re-registration unit. The re-registration unit may be configured to perform a data re-registration on each frame of point cloud data using the global point cloud registration technique.

On the basis of the above embodiments, the 3D map generating module 503 may include a data acquisition unit, a data corresponding unit and a data replacing unit. The data acquisition unit may be configured to obtain point cloud data with a preset shape attribute from the initial scene map as point cloud data to be classified. The data corresponding unit may be configured to obtain the second type of point cloud data corresponding to the regularly shaped object according to the preset shape attribute of the point cloud data to be classified and a position of the point cloud data to be classified on the initial scene map. The data replacing unit may be configured to replace the second type of point cloud data with model data of a geometry model matching with the regularly shaped object according to the preset shape attribute of the second type of point cloud data corresponding to the regularly shaped object for the initial scene map by adopting a replacement rule matching with the preset shape attribute.

On the basis of the above embodiments, the 3D map generating module 503 may further include a data adjustment unit. The data adjustment unit is configured to supplement and/or correct the second type of shape data corresponding to the regularly shaped object according to the second type of shape data corresponding to the regularly shaped object of remaining frames of point cloud data and attribute information of the regularly shaped object.

On the basis of the above embodiments, the shape attribute may include a plane attribute, and/or a column attribute.

On the basis of the above embodiments, the data replacing unit may include a first replacing subunit and/or a second replacing unit. The first replacing subunit may be configured to, if it is determined that the shape attribute of the second type of point cloud data corresponding to a target regularly shaped object is the plane attribute, replace the second type of point cloud data corresponding to the target regularly shaped object with model data corresponding to a thin plane with a preset thickness by using a volume pixel fusion technique. The second replacing unit may be configured to, if it is determined that the shape attribute of the second type of point cloud data corresponding to the target regularly shaped object is the column attribute, obtain a column model matching with a predicted value of a column parameter according to the predicted value of the column parameter of the target regularly shaped object, and to replace the second type of point cloud data corresponding to the target regularly shaped object with model data corresponding to the column model.

On the basis of the above embodiments, the model data of the geometry model may be in a form of 3D patch.

The device for generating a 3D scene map provided by embodiments of the present disclosure may be configured to execute the method for generating a 3D scene map provided in any one of embodiments of the present disclosure. The device may include various functional modules for executing blocks of the method and may provide beneficial effect same to the method.

Figure 6:
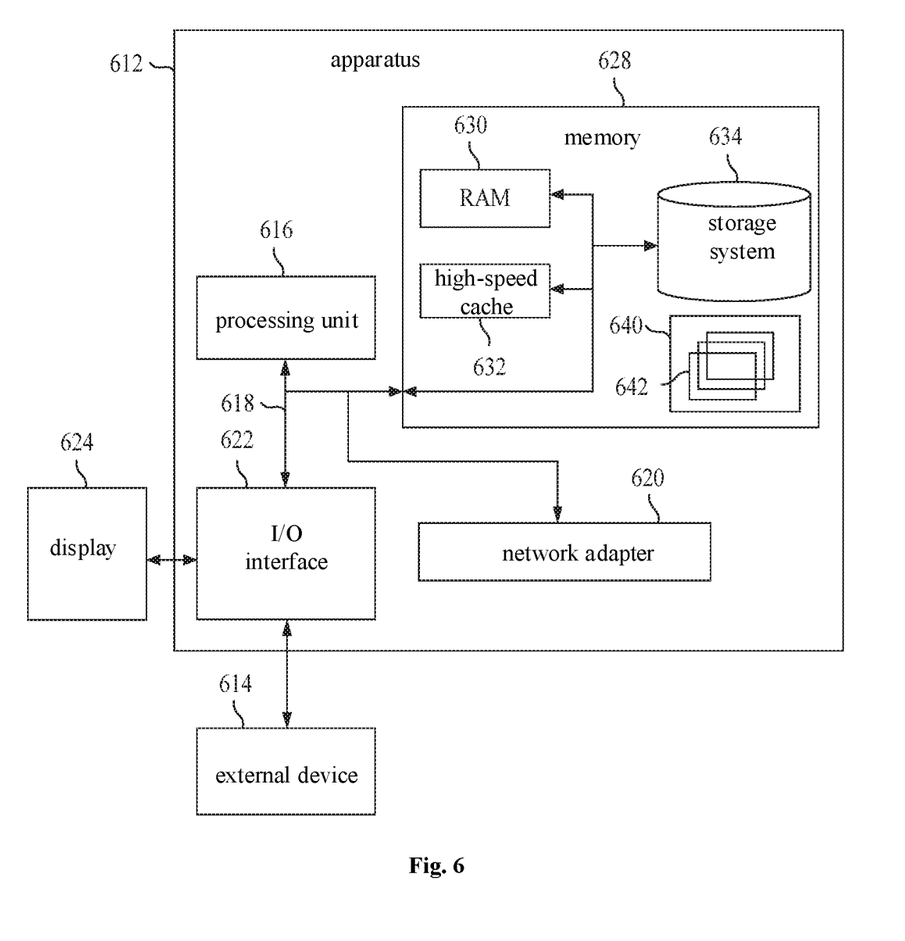
FIG. 6 is a block diagram illustrating an apparatus according to embodiments of the present disclosure.

FIG. 6 is a block diagram illustrating an apparatus according to embodiments of the present disclosure. FIG. 6 is a block diagram illustrating an exemplary apparatus 612 for implementing embodiments of the present disclosure. The apparatus 612 illustrated in FIG. 6 is only an example, and should not be considered as any restriction on the function and the usage range of embodiments of the present disclosure.

As illustrated in FIG. 6, the apparatus 612 may be in the form of a general-purpose computing apparatus. The apparatus 612 may include, but not limited to, one or more processors or processing units 616, a system memory 628, and a bus 618 connecting different system components (including the system memory 628 and the processing unit 616).

The bus 618 represents one or more of several types of bus architectures, including a memory bus or a memory control bus, a peripheral bus, a graphic acceleration port bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronic standards association (VESA) local bus, and a peripheral component interconnect (PCI) bus.

Typically, the apparatus 612 may include multiple kinds of computer-readable media. These media may be any storage media accessible by the apparatus 612, including a transitory or non-transitory storage medium and a movable or unmovable storage medium.

The system memory 628 may include a computer-readable medium in a form of volatile memory, such as a random-access memory (RAM) 30 and/or a high-speed cache memory 632. The apparatus 612 may further include other transitory/non-transitory computer system storage media and movable/unmovable computer system storage media. In way of example only, the storage system 634 may be used to read and write non-removable, non-volatile magnetic media (not illustrated in FIG. 6, commonly referred to as "hard disk drives"). Although not illustrated in FIG. 6, a disk driver for reading and writing from and to movable non-volatile magnetic disks (e.g. "floppy disks"), as well as an optical driver for reading and writing from and to movable non-volatile optical disks (e.g. a compact disc read only memory (CD-ROM, a digital video disc read only Memory (DVD-ROM), or other optical media) may be provided. In these cases, each driver may be connected to the bus 618 via one or more data medium interfaces. The memory 628 may include at least one program product, which has a set of (for example at least one) program modules. The set of program modules is configured to perform various functions of embodiments of the present disclosure.

A program/utility 640 having a set of (at least one) program modules 642 may be stored in memory 628. These program modules 642 may include, but not limit to, an operating system, one or more application programs, other program modules and program data. Any one or a combination of above examples may include an implementation in a network environment. The program modules 642 are generally configured to implement functions and/or methods described in embodiments of the present disclosure.

The apparatus 612 may also communicate with one or more external devices 614 (e.g., a keyboard, a pointing device, a display 624, and etc.) and may also communicate with one or more devices that enables a user to interact with the apparatus 612, and/or any device (e.g., a network card, a modem, and etc.) that enables the apparatus 612 to communicate with one or more other computing devices. This kind of communication can be achieved by the input/output (I/O) interface 622. In addition, the apparatus 612 may be connected to and communicate with one or more networks such as a local area network (LAN), a wide area network (WAN) and/or a public network such as the Internet through a network adapter 20. As illustrated, the network adapter 620 communicates with other modules of the apparatus 612 over bus 618. It should be understood that although not illustrated in the figures, other hardware and/or software modules may be used in combination with the apparatus 612, which including, but not limited to, microcode, device drivers, redundant processing units, external disk drive arrays, RAID systems, tape drives, as well as data backup storage systems and the like.

The apparatus 612 may be a terminal device. The processing unit 616 of the apparatus 612 may perform various functional applications and data processing by running programs stored in the system memory 628, for example, to perform the method for generating a 3D scene map according to embodiments of the present disclosure. The method may include the following. At least two frames of point cloud data collected by a collection device is obtained. Data registration is performed on the at least two frames of point cloud data. First type of point cloud data corresponding to a movable obstacle is deleted from each frame of point cloud data, and each frame of point cloud data is merged to obtain an initial scene map. Second type of point cloud data corresponding to a regularly shaped object is replaced with model data of a geometry model matching with the regularly shaped object for the initial scene map to obtain the 3D scene map.

Embodiments of the present disclosure further provide a computer readable storage medium, having computer programs stored therein. When the computer programs are executed by a processor, a method for generating a 3D scene map according to embodiments of the present disclosure is executed. The method may include the following. At least two frames of point cloud data collected by a collection device is obtained. Data registration is performed on the at least two frames of point cloud data. First type of point cloud data corresponding to a movable obstacle is deleted from each frame of point cloud data, and each frame of point cloud data is merged to obtain an initial scene map. Second type of point cloud data corresponding to a regularly shaped object is replaced with model data of a geometry model matching with the regularly shaped object for the initial scene map to obtain the 3D scene map.

The storage medium of the present disclosure may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media includes (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof.

In context, the computer readable storage medium may be any tangible medium including or storing programs. The programs may be used by an instruction executed system, apparatus or device, or a connection thereof.

The computer readable signal medium may include a data signal propagating in baseband or as part of carrier which carries a computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method for generating a three-dimensional scene map, comprising:
    obtaining at least two frames of point cloud data collected by a collection device;
    identifying an obstacle from each frame of point cloud data, and obtaining semantic information corresponding to the obstacle for each frame of point cloud data;
    classifying the obstacle as a static obstacle or the a movable obstacle according to the semantic information corresponding to the obstacle, for each frame of point cloud data;
    pairing the static obstacles from two adjacent frames of point cloud data to perform an initial registration on the two adjacent frames of point cloud data;
    performing a precise registration on the at least two frames of point cloud data subjected to the initial registration through a global point cloud registration technique;
    deleting, from each frame of point cloud data, first type of point cloud data corresponding to the movable obstacle to obtain remaining point cloud data, and merging each frame of remaining point cloud data to obtain an initial scene map;
    replacing second type of point cloud data corresponding to a regularly shaped object with model data of a geometry model matching with the regularly shaped object for the initial scene map to obtain the three-dimensional scene map; and
    performing a data re-registration on each frame of remaining point cloud data using the global point cloud registration technique, after deleting the first type of the point cloud data corresponding to the movable obstacle.

2. The method of claim 1, wherein deleting, from each frame of point cloud data, the first type of point cloud data corresponding to the movable obstacle comprises:
    determining an ideal motion trajectory of the movable obstacle based on a position of the movable obstacle in each frame of point cloud data;
    correcting the first type of point cloud data corresponding to the movable obstacle for each frame of point cloud data based on the ideal motion trajectory of the movable obstacle; and
    deleting, from each frame of point cloud data, the first type of point cloud data corresponding to the movable obstacle.

3. The method of claim 1, wherein replacing the second type of point cloud data corresponding to the regularly shaped object with the model data of the geometry model matching with the regularly shaped object in the initial scene map to obtain the three-dimensional scene map comprises:
    obtaining point cloud data with a preset shape attribute as point cloud data to be classified, from the initial scene map, the preset shape attribute being related to the regularly shaped object;
    obtaining the second type of point cloud data corresponding to the regularly shaped object according to the preset shape attribute of the point cloud data to be classified and a position of the point cloud data to be classified on the initial scene map; and
    replacing the second type of point cloud data of the initial scene map with the model data of the geometry model matching with the regularly shaped object based on the preset shape attribute of the second type of point cloud data by adopting a replacement rule matching with the preset shape attribute.

4. The method of claim 3, further comprising:
    for a frame of point cloud data, supplementing and/or correcting the second type of shape data corresponding to the regularly shaped object according to second type of shape data corresponding to the regularly shaped object of remaining frames of point cloud data and attribute information of the regularly shaped object.

5. The method of claim 3, wherein the preset shape attribute comprises at least one of a plane attribute and a column attribute.

6. The method of claim 5, wherein replacing the second type of point cloud data of the initial scene map with the model data of the geometry model matching with the regularly shaped object according to the preset shape attribute of the second type of point cloud data by adopting the replacement rule matching the preset shape attribute comprises:
    in response to determining that the preset shape attribute of the second type of point cloud data corresponding to a target regularly shaped object is the plane attribute, replacing the second type of point cloud data corresponding to the target regularly shaped object with model data corresponding to a thin plane with a preset thickness by using a volume pixel fusion technique;
    and/or in response to determining that the preset shape attribute of the target regularly shaped object corresponding to the second type of point cloud data is the column attribute, obtaining a column model matching with a predicted value of a column parameter according to the predicted value of the column parameter of the target regularly shaped object; replacing the second type of point cloud data corresponding to the target regularly shaped object with model data corresponding to the column model.

7. The method of claim 6, wherein the model data of the geometry model is in a form of three-dimensional patch.

8. An apparatus, comprising:
    one or more processors; and
    a memory, configured to store one or more programs,
    wherein when the one or more programs are executed by the one or more processors, the one or more processors are configured to
    obtain at least two frames of point cloud data collected by a collection device;
    identify an obstacle from each frame of point cloud data, and obtain semantic information corresponding to the obstacle for each frame of point cloud data;

classify the obstacle as a static obstacle or the a movable obstacle according to the semantic information corresponding to the obstacle, for each frame of point cloud data;

pair the static obstacles from two adjacent frames of point cloud data to perform an initial registration on the two adjacent frames of point cloud data;

perform a precise registration on the at least two frames of point cloud data subjected to the initial registration through a global point cloud registration technique;

delete, from each frame of point cloud data, first type of point cloud data corresponding to the movable obstacle to obtain remaining point cloud data, and merge each frame of remaining point cloud data to obtain an initial scene map;

replace second type of point cloud data corresponding to a regularly shaped object with model data of a geometry model matching with the regularly shaped object for the initial scene map to obtain the three-dimensional scene map; and perform a data re-registration on each frame of remaining point cloud data using the global point cloud registration technique, after the first type of the point cloud data corresponding to the movable obstacle is deleted.

9. The apparatus of claim 8, wherein the one or more processors are configured to delete, from each frame of point cloud data, the first type of point cloud data corresponding to the movable obstacle by:

determining an ideal motion trajectory of the movable obstacle based on a position of the movable obstacle in each frame of point cloud data;

correcting the first type of point cloud data corresponding to the movable obstacle for each frame of point cloud data based on the ideal motion trajectory of the movable obstacle; and deleting, from each frame of point cloud data, the first type of point cloud data corresponding to the movable obstacle.

10. The apparatus of claim 8, wherein the one or more processors are configured to replace the second type of point cloud data corresponding to the regularly shaped object with the model data of the geometry model matching with the regularly shaped object in the initial scene map to obtain the three-dimensional scene map by:

obtaining point cloud data with a preset shape attribute as point cloud data to be classified, from the initial scene map, the preset shape attribute being related to the regularly shaped object;

obtaining the second type of point cloud data corresponding to the regularly shaped object according to the preset shape attribute of the point cloud data to be classified and a position of the point cloud data to be classified on the initial scene map; and replacing the second type of point cloud data of the initial scene map with the model data of the geometry model matching with the regularly shaped object based on the preset shape attribute of the second type of point cloud data by adopting a replacement rule matching with the preset shape attribute.

11. The apparatus of claim 10, wherein the one or more processors are further configured to:

for a frame of point cloud data, supplement and/or correct the second type of shape data corresponding to the regularly shaped object according to second type of shape data corresponding to the regularly shaped object of remaining frames of point cloud data and attribute information of the regularly shaped object.

12. The apparatus of claim 10, wherein the preset shape attribute comprises at least one of a plane attribute and a column attribute.

13. The apparatus of claim 12, wherein the one or more processors are configured to replace the second type of point cloud data of the initial scene map with the model data of the geometry model matching with the regularly shaped object according to the preset shape attribute of the second type of point cloud data by adopting the replacement rule matching the preset shape attribute by:

in response to determining that the preset shape attribute of the second type of point cloud data corresponding to a target regularly shaped object is the plane attribute, replacing the second type of point cloud data corresponding to the target regularly shaped object with model data corresponding to a thin plane with a preset thickness by using a volume pixel fusion technique; and/or in response to determining that the preset shape attribute of the target regularly shaped object corresponding to the second type of point cloud data is the column attribute, obtaining a column model matching with a predicted value of a column parameter according to the predicted value of the column parameter of the target regularly shaped object; replacing the second type of point cloud data corresponding to the target regularly shaped object with model data corresponding to the column model.

14. The apparatus of claim 13, wherein the model data of the geometry model is in a form of three-dimensional patch.

15. A non-transitory computer readable storage medium, having computer programs stored therein, wherein when the computer programs are executed by a processor, the method for generating a three-dimensional scene map is executed, the method comprising:

obtaining at least two frames of point cloud data collected by a collection device;

identifying an obstacle from each frame of point cloud data, and obtaining semantic information corresponding to the obstacle for each frame of point cloud data;

classifying the obstacle as a static obstacle or a movable obstacle according to the semantic information corresponding to the obstacle, for each frame of point cloud data;

pairing the static obstacles from two adjacent frames of point cloud data to perform an initial registration on the two adjacent frames of point cloud data;

performing a precise registration on the at least two frames of point cloud data subjected to the initial registration through a global point cloud registration technique;

deleting, from each frame of point cloud data, first type of point cloud data corresponding to the movable obstacle to obtain remaining point cloud data, and merging each frame of remaining point cloud data to obtain an initial scene map;

replacing second type of point cloud data corresponding to a regularly shaped object with model data of a geometry model matching with the regularly shaped object for the initial scene map to obtain the three-dimensional scene map; and performing a data re-registration on each frame of remaining point cloud data using a global point cloud registration technique, after deleting the first type of the point cloud data corresponding to the movable obstacle.

* * * * *